Patented Dec. 23, 1952

2,623,043

UNITED STATES PATENT OFFICE 2,623,043

12-BROMO STEROID ADDUCTS

Robert H. Levin, A Vern McIntosh, Jr., and George B. Spero, Kalamazoo, Mich., assignors to The Upjohn Company, Kalamazoo, Mich., a corporation of Michigan No Drawing. Application September 13, 1950, Serial No. 184,702

4 Claims. (Cl. 260—239.55)

1

The present invention relates to adducts of 12-bromo - 3-acyloxy-5,7,9(11)-pregnatrien-20-ones with certain dienophillic acids, anhydrides, and esters, and to a process for the production thereof.

The compounds of the present invention may be represented by the structural formula:

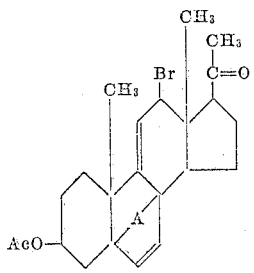

wherein Ac is the residue of an organic carboxylic acid, especially those containing from one to eight carbon atoms, inclusive; and A is the adduct radical of a dienophile selected from the group consisting of maleic acid, maleic anhydride, and maleic acid diesters containing from one to eight carbon atoms, inclusive, in the esterifying group.

It is an object of the present invention to provide a novel group of compounds which are useful in the preparation of steroid compounds containing an oxygen atom at carbon atom eleven. Another object of the invention is the provision of a process for the production of the novel compounds, adducts of 12 - bromo - 3 - acyloxy-5,7,9(11)-pregnatrien-20-ones. Other objects of the invention will become apparent hereinafter.

The compounds of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, particularly those oxygenated at carbon atom eleven, as well as to investigate the biological activity of the adducts themselves and their transformation products. The importance of such investigation is moreover emphasized by the acute shortage of adrenal cortical hormones, and the absence of any present suggestion for alleviation of the said shortage except through organic synthesis.

Novel compounds of the present invention which are of particular interest are those compounds of the above generic formula wherein AcO represents an ester of the 3-hydroxy group with a carboxylic acid containing up to and including eight carbon atoms. Among the acids which can be used are formic, acetic, propionic, butyric, valeric, hexanoic, heptanoic, octanoic, succinic, glutaric, cyclopentanoic, cyclohexanoic, benzoic, toluic, and the like. Preferred acids are the lower-aliphatic acids. The acids may also contain substituents, such as halo, alkyl, and methoxy, which are non-reactive under the reaction conditions employed. The adduct bridge (—A—) in such compounds may be represented by the graphic formula:

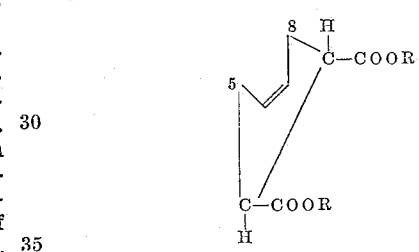

wherein R represents hydrogen or the organic residue of an alcohol. Such esters include the methyl, ethyl, propyl, isopropyl, butyl, isobutyl, lauryl, heptyl, octyl, cyclopentyl, cyclohexyl, benzyl, and the like esters. The esterifying radical may also contain non-reactive substituents, such as halo, methoxy, or hydroxy, if desired. While the esters of the maleic acid adduct are described herein with particular reference to the methyl esters, the preferred embodiment of R is a lower-alkyl radical containing from one to eight carbon atoms, inclusive. Alternatively, the adduct bridge (—A—) may be depicted by the graphic formula:

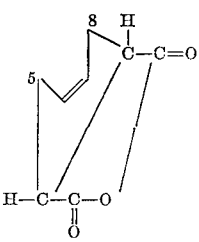

which is representative of the maleic anhydride adduct. The compounds of the invention are usually colorless crystalline solids. The acid and anhydride adducts are readily converted into diester adducts by esterification with conventional reagents such as the diazoalkanes [Wilds et al., J. Org. Chem. 13, 763 (1948)]. The dibasic acids may be converted into their corresponding anhydrides by heat.

The compounds of the present invention have the formula:

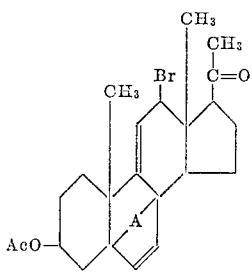

wherein A and Ac have the values previously assigned. These 12-bromo compounds are prepared by the selective bromination of the corresponding 3 - acyloxy-5,7,9(11)-pregnatrien-20-one adduct using about one mole, preferably a slight excess over one mole, of N-bromosuccinimide per mole of starting steroid. The reaction is conducted in a halogenated hydrocarbon medium, e. g., carbon tetrachloride, at a temperature between about 25 and 100 degrees centigrade and is complete in a very short time, usually less than one hour, when the reaction is conducted in carbon tetrachloride solution at about reflux temperature. The use of light as a catalyst is recommended for the procurement of optimum yields of desired 12-bromo adduct. Upon completion of the reaction, the succinimide may be filtered from the reaction mixture, the filtrate evaporated to dryness, and the 12-bromo adduct crystallized from an organic solvent to give a more highly purified product.

The 3-acyloxy-5,7,9(11) - pregnatrien-20-one adducts are conveniently prepared by the selective oxidation of an enol ester of an adduct of 3-acyloxybisnor-5,7,9(11) - cholatrien-22-al, represented by the formula:

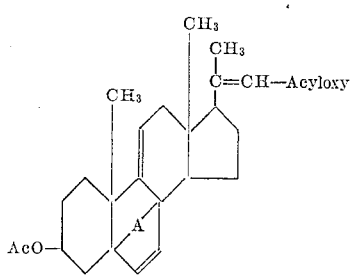

wherein A and Ac have the values previously given.

Adducts of 3,22 - diacyloxybisnor - 5 , 7 , 9 (11), 20(22)-cholatetraenes [22-enol esters of 3-acyloxybisnor-5,7,9(11)-cholatrien-22-als] are conveniently prepared by subjecting an adduct of a 3-acyloxybisnor-5,7,9(11) - cholatrien - 22 - al, of the formula:

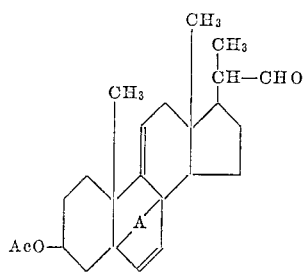

wherein A and Ac have the values previously given, to the action of an acid anhydride or an acid halide in the presence of an alkaline salt of the acid. The starting adducts of 3-acyloxybisnor-5,7,9(11)-cholatrien-22-als can be prepared from adducts of 3-esters of dehydroergosterol by selective oxidation as described and claimed in the copending application Serial 111,100 of Robert H. Levin, filed August 18, 1949, and as more fully described hereinafter.

The 3-esters of dehydroergosterol, from which the 3-acyloxybisnor-5,7,9(11) -cholatrien - 22 - al adducts are prepared, can be synthesized in several ways starting with ergosterol. For example, ergosterol can be transformed to dehydroergosterol with mercuric acetate according to known methods [Windaus et al., Ann. 465, 157 (1928)] and the 3-hydroxy group of the dehydroergosterol acylated by known procedure. Alternatively the 3-hydroxy group of ergosterol can be acylated prior to the preparation of the dehydro derivative, a procedure which is particularly preferred in the preparation of the 3-acetoxy derivative. The adducts of dehydroergosterol are then prepared by the addition of maleic anhydride or the like to dehydroergosterol or a 3-ester thereof according to known methods [Honigmann, Ann. 503, 89 (1934)]. The anhydrides can then be converted to their corresponding acids and esters if desired.

The ester group, when present in the 3-position of dehydroergosterol, is for the purpose of protecting the 3-hydroxy group in subsequent chemical reactions. For this purpose any convenient ester of an organic carboxylic acid, which is non-reactive under the conditions of the reaction, is suitable. The preferred acids are the fatty acids such as formic, acetic, propionic, butyric, valeric, hexanoic, heptanoic, octanoic; dibasic acids such as malonic, succinic, phthalic; cycloaliphatic acids such as cyclopentanoic and cyclohexanoic; and aromatic acids such as benzoic, toluic, naphthoic, and the like. The acids may also contain substituents such as halogen, alkyl, the methoxy radical, and the like, and these substituents will be carried throughout the synthesis. If desired, the acyl group can be changed to another acyl group by saponifying the ester to give a 3-hydroxy compound, which can then be re-esterified as previously described.

A preferred method for preparing some of the dehydroergosteryl adducts comprises the saponification of a 3-acyloxy adduct of dehydroergosterol with dilute alkali followed by acidification. The 3-hydroxy dicarboxylic acid thus formed can be converted to the 3-hydroxy anhydride by heat, or it can be converted to any desired 3-acyloxy anhydride adduct by heating under reflux with the appropriate acid anhydride or chloride in pyridine solution. Dialkyl esters of the previously mentioned dicarboxylic acid adducts can be prepared by subjecting the acid to the action of an esterification reagent such as a diazoalkane [Wilds et al., J. Org. Chem. 13, 763 (1948)], e. g., diazomethane, diazoethane, diazobutane, and the like.

The selective oxidation of an adduct of dehydroergosterol, or a 3-ester thereof, to produce an adduct of 3-hydroxybisnor-5,7,9(11)-cholatrien-22-al, or a 3-ester thereof, is accomplished by dissolving the dehydroergosteryl adduct in a suitable solvent, cooling to about minus eighty to plus thirty degrees centigrade, and passing ozone into the solution until about 1.0 to 1.25 moles of ozone per mole of adduct have been absorbed. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the preferred range are readily obtained by cooling the solution of the adduct with a bath of solid carbon dioxide in acetone or the like, although various other methods of cooling can be used. Many of the customary solvents used in ozonizations such as chloroform, acetic acid, carbon tetrachloride, ethylene chloride, methylene chloride, and the like, can be used.

The ozonides are then decomposed under reducing conditions, that is, in the absence of oxidizing agents, whether added or formed in the course of the reaction by products of decomposition of the ozonide. This means that excess oxygen formed by decomposition of the ozonide is prevented from forming hydrogen peroxide by combining with any moisture present, and that molecular oxygen is prevented from oxidizing the aldehyde thus formed. This can be conveniently accomplished by decomposing the ozonide in glacial acetic acid by the addition of finely-powdered zinc.

As is conventional with ozonizations when conducted in solvents, other than glacial acetic acid, the solvent used for ozonization is replaced, after completion of the ozonization, by adding glacial acetic acid and removing the lower-boiling solvent by fractional distillation. Alternatively, the solvent can be removed by careful warming under reduced pressure prior to the addition of glacial acetic acid, if desired.

After decomposition of the ozonide and removal of the zinc, the aldehyde can be recovered by diluting the acetic acid with water, or in other conventional manner, such as by formation of an aldehyde derivative, e. g., the dinitrophenylhydrazone.

Adducts of 3,22 - diacyloxybisnor-5,7,9(11),20-(22)-cholatetraenes [22-enol-esters of adducts of 3-acyloxybisnor-5,7,9(11)-cholatrien - 22 - als] can be conveniently prepared by heating the corresponding 3-hydroxy or 3-acyloxy aldehyde maleic acid, maleic acid anhydride, or maleic acid ester adduct with a large excess of an organic carboxylic acid anhydride in the presence of a small amount of the alkali-metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic, and octanoic anhydrides, as well as benzoic acid anhydride, ortho-toluic acid anhydride, and the like, are also operative. The acid anhydrides can also be substituted by non-reactive groups, such as halo, alkyl, and methoxy, as in the case of chloroacetic, ortho-toluic, or methoxybenzoic acid anhydrides. The reaction can be conveniently followed by observing the color changes in the reaction mixture, optimum yields being obtained by discontinuing the application of heat when the color of the solution changes from yellow to brown. Ordinarily the reaction mixture is heated at about 140 degrees centigrade for from about four to six hours, but temperatures as low as 100 and as high as 180 degrees centigrade are also operative. The reaction is usually conducted at the boiling point of the anhydride, but in the case of the higher-boiling anhydrides, such as benzoic anhydride, a suitable temperature control, such as 100–150 degrees centigrade, must be used, since the adduct otherwise tends to decompose in the higher temperature range. If a 3-hydroxy aldehyde adduct is thus reacted with an anhydride, the hydroxy group will be acylated, and, similarly, if a maleic acid adduct is used instead of a diester or an anhydride, the anhydride will be formed. The enol ester can be isolated by removing the excess anhydride under reduced pressure, and separating the enol ester from alkali-metal salts, which procedure yields a product sufficiently pure for most purposes, but which can be further purified by recrystallization from acetone-water, acetone-pentane, or like solvents, if desired.

The ozonization of the thus-prepared enol acylate to produce a 3-acyloxy-5,7,9(11)-pregnatrien-20-one adduct involves dissolving the enol ester in a suitable solvent, cooling to about minus eighty degrees centigrade to plus thirty degrees centigrade, and passing ozone, ozonized air, or ozonized oxygen into the solution until about 1.0 to about 1.25 moles, preferably 1.0 to 1.1 moles, of ozone per mole of adduct have been absorbed. The addition of ozone to the 20:22 double bond is so rapid that only a small amount of ozone escapes from the reaction mixture, and the amount of ozone ordinarily required therefore closely approximates the theoretical amount. Loss to the solvent, if any loss occurs, must be taken into consideration in calculating the amount of ozone to be introduced. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the range are readily obtained by cooling the solution of the adduct with a bath of solid carbon dioxide in acetone or the like, although various other methods of cooling may be employed. Many of the customary solvents used in ozonizations, such as chloroform, methylene chloride, ethylene chloride, carbon tetrachloride, acetic acid, and the like, can be used for the ozonization reaction.

The 20:22 ozonides thus produced are then decomposed under conditions normally employed for decomposition of such compounds. This can conveniently be accomplished by decomposing the ozonide with hydrogen peroxide, by hydrolysis, by treatment with zinc in glacial acetic acid, or by a catalytic amount of colloidal metal such as silver, platinum, or palladium in a solvent, such as glacial acetic acid, alcohol, or ethyl acetate, in which latter case reductive conditions, e. g. a hydrogen atmosphere, are also employed. The use of "reductive conditions" is well established in the art [Hill and Kelly, "Organic Chemistry," page 53, The Blackiston Company, Philadelphia, (1934); Church et al., J. Am. Chem. Soc. 56, 176–184 (1934); Gilman, "Organic Chemistry," second edition, page 636, John Wiley and Sons, New York (1943); Long, Chem. Reviews 27, 452–454 (1940)].

As is conventional with decomposition of ozonides with zinc, when the ozonizations are conducted in solvents other than glacial acetic acid, the solvent used for the ozonization is replaced, after completion of the ozonization, by adding glacial acetic acid and removing the lower-boiling solvent by fractional distillation, or the solvent can be removed by careful warming under reduced pressure prior to the addition of acetic acid, if desired. After decomposition of the 20:22 ozonide and removal of the metal, the ketone can be recovered by diluting the acetic acid with water, or by other conventional procedure for the recovery of ketones, such as by formation of a carbonyl derivative, e. g., the 2,4-dinitrophenylhydrazone. Recrystallization from acetone or the like results in a more highly purified ketone product.

The following examples are illustrative of the process and products of the present invention, but are not to be construed as limiting.

*Preparation 1.—Dimethyl maleate adduct of dehydroergosteryl benzoate*

To a solution of 21 grams of dimethyl maleate adduct of dehydroergosterol in 69 milliliters of warm pyridine was added 9.5 milliliters of benzoyl chloride. After standing at room temperature for fifteen minutes, the mixture was poured into 1400 milliliters of ice-water and the solid removed by filtration, dried, and recrystallized from acetone. There was thus obtained 26.4 grams of dimethyl maleate adduct of dehydroergosteryl benzoate, melting at 203 to 205.5 degrees centigrade.

*Preparation 2.—Dimethyl maleate adduct of dehydroergosteryl acetate*

In a manner essentially that described in Preparation 1, the dimethyl maleate adduct of dehydroergosteryl acetate, melting at 177 to 179 degrees centigrade, was prepared from the dimethyl maleate adduct of dehydroergosterol and acetyl chloride.

*Preparation 3.—Dimethyl maleate adduct of dehydroergosteryl formate*

A solution of six grams of dimethyl maleate adduct of dehydroergosterol in fifty milliliters of 87 percent formic acid was heated under reflux for one hour, cooled, and the dimethyl maleate adduct of dehydroergosteryl formate filtered therefrom. Upon crystallization from acetone, the purified material melted at 177.5 to 178.5 degrees centigrade.

*Preparation 4.—Maleic acid adduct of dehydroergosterol*

A solution of 2.0 grams of sodium hydroxide in twenty milliliters of water was added to a solution of 1.73 grams of the maleic anhydride adduct of dehydroergosteryl acetate (M. P. 230–232 degrees centigrade) in forty milliliters of dioxane. The mixture solidified, but dissolved on addition of 300 milliliters of water and heating to eighty degrees centigrade. After half an hour the solution was cooled and made acid with aqueous three normal hydrochloric acid, to give 1.61 grams of precipitate. On crystallization from a dioxane-water mixture, the maleic adduct of dehydroergosterol melted at 190–192 degrees centigrade.

*Preparation 5.—Maleic anhydride adduct of 3-heptanoyloxydehydroergosterol*

The maleic acid adduct of dehydroergosterol from Preparation 4 was dissolved in a mixture of seven milliliters of warm pyridine and fourteen milliliters of heptylic anhydride, and the mixture heated under reflux for one hour. About eighty percent of the reaction solvent was removed under reduced pressure, and the residue then dissolved in methyl alcohol. The methyl alcohol solution was concentrated and cooled to yield 4.8 grams of the maleic anhydride adduct of 3-heptanoyloxydehydroergosterol, melting at 186–191.5 degrees centigrade.

*Preparation 6.—Maleic anhydride adduct of 3-beta-acetoxybisnor-5,7,9(11)-cholatrien-22-al*

A solution of 5.35 grams of the maleic anhydride adduct of 3-beta-acetoxydehydroergosterol in 107 milliliters of methylene chloride was cooled to about minus seventy degrees centigrade and ozonized until 505 milligrams of ozone had been absorbed. The temperature of the solution was then gradually raised to about plus ten to fifteen degrees centigrade, whereupon seventy milliliters of glacial acetic acid was added and the methylene chloride removed under reduced pressure. Seven grams of zinc dust was then added to the cold solution at a uniform rate over a period of ten minutes, while keeping the reaction temperature below plus twenty degrees centigrade. After being stirred for fifteen minutes, the mixture was filtered and the filtrate poured into water. There was thus obtained 4.31 grams of maleic anhydride adduct of 3-beta-acetoxybisnor-5,7,9(11)-cholatrien-22-al, a fine white powder which melted at 187–197 degrees centigrade.

To a solution of 0.30 gram of the maleic anhydride adduct of 3-beta-acetoxybisnor-5,7,9(11)-cholatrien-22-al, in thirty milliliters of ethanol, was added twenty milliliters of alcohol containing one percent 2,4-dinitrophenylhydrazine and three percent concentrated hydrochloric acid. The mixture was allowed to stand for one hour at room temperature and then placed in a refrigerator to complete precipitation of the yellow crystals. The precipitate was then collected and recrystallized from a mixture of chloroform and alcohol, to give the 2,4-dinitrophenylhydrazone of the maleic anhydride adduct of 3-beta-acetoxybisnor - 5,7,9(11) - cholatrien - 22 - al, melting at 269–271 degrees centigrade.

*Preparation 7.—Maleic anhydride adduct of 3-beta-acetoxybisnor-5,7,9(11)-cholatrien-22-al*

A two-liter round-bottom flask was charged with fifty grams (0.93 mole) of dehydroergosteryl acetate maleic anhydride adduct and one liter of methylene chloride. The solution was cooled to Dry-Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 percent) of ozone being passed into the solution. The reaction mixture was transferred to a two-liter, round-bottom flask fitted with a capillary and a condenser for downward distillation, 300 milliliters of acetic acid added, and the methylene chloride distilled over in vacuo at forty degrees centigrade or below. The flask was then placed in a water bath and fitted with a stirrer. An additional 200 milliliters of acetic acid was added and the ozonide decomposed by the addition of fifty grams of zinc dust. The zinc dust was added in portions over a period of twenty to thirty minutes while the solution was stirred and the temperature maintained at seventeen to twenty degrees centigrade. After addition, the mixture was stirred for another twenty minutes and then filtered. The precipitated zinc dust was washed by filtering 100 milliliters of acetic acid therethrough, and the filtrate gradually diluted with water (1100 to 1200 milliliters) until the product had been drowned out. The product was then cooled in the refrigerator overnight and filtered. The yield of crystalline product was 42 grams, assaying 89–95 percent of the desired aldehyde.

*Preparation 8*

In a manner essentially that described in Preparation 6, the following compounds were prepared.

(1) Maleic anhydride adduct of 3-beta-formoxybisnor-5,7,9(11)-cholatrien-22-al, melting at 95–130 degrees centigrade. 2,4-dinitrophenylhydrazone, melting at 165–168 degrees centigrade (2) Maleic anhydride adduct of 3-beta-heptanoyloxybisnor-5,7,9(11)-cholatrien-22-al, melting at 197.5–199 degrees centigrade. 2,4-dinitrophenylhydrazone, melting at 253–257 degrees centigrade (3) Dimethyl maleate adduct of 3-beta-benzoyloxybisnor-5,7,9(11)-cholatrien-22-al, melting at 183–187 degrees centigrade. 2,4-dinitrophenylhydrazone, melting at 224–249 degrees centigrade (4) Dimethyl maleate adduct of 3-beta-acetoxybisnor-5,7,9(11)-cholatrien-22-al, melting at 172–178 degrees centigrade. 2,4-dinitrophenylhydrazone, melting at 238 to 244 degrees centigrade (5) Dimethyl maleate adduct of 3-hydroxybisnor-5,7,9(11)-cholatrien-22-al, melting at 163–170 degrees centigrade. 2,4-dinitrophenylhydrazone, melting at 250–254 degrees centigrade In a manner similar to the above, the maleic anhydride adduct of 3-hydroxybisnor-5,7,9(11)-cholatrien-22-al is obtained from dehydroergosteryl maleic anhydride adduct; the maleic acid adduct of 3-hydroxybisnor-5,7,9(11)-cholatrien-22-al is obtained from dehydroergosteryl maleic acid adduct; and 3-acyloxybisnor-5,7,9(11)-cholatrien-22-al maleic acid adducts are obtained from the maleic acid adduct of 3-acyloxydehydroergosterols.

*Preparation 9.—Dimethyl maleate adduct of 3-hydroxybisnor-5,7,9(11)-cholatrien-22-al*

A solution of 2.69 grams (0.005 mole) of the dimethyl ester of the maleic acid adduct of dehydroergosterol, in eighty milliliters of methylene chloride, cooled by a Dry-Ice and trichloroethylene bath, was treated with ozonized oxygen until 247.36 milligrams (0.0051 mole) of ozone was absorbed. The solution was then allowed to warm to room temperature, whereafter thirty milliliters of acetic acid was added and the methylene chloride removed in vacuo. While cooling in a water-bath at fifteen degrees centigrade, four grams of zinc dust was added in portions with stirring, the temperature being maintained between fifteen and twenty degrees centigrade. Stirring was continued for another fifteen minutes, whereafter the zinc was separated by filtration. The filtrate was diluted with water to cloudiness, extracted with ether, the ether extract washed with sodium bicarbonate and then with water to neutrality, the solution then dried over sodium sulfate and evaporated to dryness in vacuo. The residue was crystallized from acetic acid and water, giving 1.92 grams (81.5 percent of the theoretical), melting point 91–97 degrees centigrade, which yielded a dinitrophenylhydrazone derivative in 72.5 percent yield, melting point 212–238 degrees centigrade. The aldehyde was recrystallized and found to have a purified melting point of 163–170 degrees centigrade, while the dinitrophenylhydrazone derivative was recrystallized until a melting point of 250–254 degrees centigrade was attained.

*Preparation 10.—Maleic anhydride adduct of 3-beta - acetoxy - 22 - acetoxybisnor-5,7,9(11),20(22)-cholatetraene*

A mixture of twenty grams of the maleic anhydride adduct of 3-beta-acetoxybisnor-5,7,9(11)-cholatrien-22-al, six grams of anhydrous sodium acetate, and 600 milliliters of acetic anhydride, was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3-beta-acetoxy - 22 - acetoxybisnor - 5,7,9(11),20(22) - cholatetraene, which melted at 186 to 193 degrees centigrade. Recrystallization of the crude product from a mixture of acetone and pentane raised the melting point to 200.5 to 202 degrees centigrade.

*Preparation 11*

In a manner essentially that described in Preparation 10, the following compounds were prepared.

(1) The dimethyl maleate adduct of 3-beta-benzoyloxy-22-acetoxybisnor-5,7,9(11),20(22) - cholatetraene, which melted at 210 to 211 degrees centigrade (2) The dimethyl maleate adduct of 3-beta-acetoxy - 22 - acetoxybisnor - 5,7,9(11),20(22) - cholatetraene, which melted at 181 to 183 degrees centigrade In the same manner as given above, 22-acyloxy, e. g., formoxy, acetoxy, propionoxy, butyroxy, valeroxy, hexanoyloxy, heptanoyloxy, octanoyloxy, benzoyloxy, and the like 3-acyloxybisnor-5,7,9(11),20(22)-cholatetraene adducts, are obtained from the compounds of Preparations 6,7, and 8. Such representative compounds include 3 - formoxy - 22 - acetoxybisnor-5,7,9(11),20(22) - cholatetraene, 3-propionoxy - 22 - acetoxybisnor-5,7,9(11),20(22)-cholatetraene, 3,22 - dipropionoxybisnor - 5,7,9(11),20(22) - cholatetraene, 3,22-dibenzoyloxybisnor - 5,7,9(11),20(22)-cholatetraene, and 3-heptanoyloxy-22-octanoyloxybisnor-5,7,9(11),20(22) - cholatetraene adducts with maleic anhydride or maleic acid esters such as the dimethyl maleate, diethyl maleate, dipropyl maleate, diisopropyl maleate, dibutyl maleate, dioctyl maleate, dibenzyl maleate, and the like.

*Preparation 12.—Maleic anhydride adduct of 3-beta-acetoxy-5,7,9(11)-pregnatrien-20-one*

A solution of 5.08 grams of the maleic anhydride adduct of 3-beta-acetoxpbisnor-5,7,9(11)-cholatrien-22-al enol acetate in 100 milliliters of methylene chloride was cooled to about minus seventy degrees centigrade and ozonized until 483 milligrams of ozone had been absorbed. Fifty milliliters of glacial acetic acid was then added and the methylene chloride removed under reduced pressure. An additional thirty milliliters of glacial acetic acid was then added and the ozonide decomposed by adding seven grams of powdered zinc at a substantially uniform rate while maintaining the reaction temperature between seventeen and twenty degrees centigrade. The mixture was stirred for an additional twenty minutes, filtered, and the zinc washed with 140 milliliters of glacial acetic acid. The organic extracts were combined and diluted with seventy milliliters of water. When crystallization commenced, the rate of precipitation was increased by addition of two volumes of water. There was thus obtained 4.0 grams of the maleic anhydride adduct of 3-beta-acetoxy-5,7,9(11)-pregnatrien-20-one, which melted at 240 to 264.5 degrees centigrade. Several recrystallizations of the crude material from acetone raised the melting point to 263.5 to 264.5 degrees centigrade.

*Preparation 13.—Maleic acid adduct of 3-beta-hydroxy-5,7,9(11)-pregnatrien-20-one*

A solution of 4.52 grams (0.01 mole) of the maleic anhydride adduct of 3-beta-acetoxy-5,7,9(11)-pregnatrien-20-one, M. P. 263–264.5 degrees centigrade, in a mixture of 100 milliliters of 1,4-dioxane and 400 milliliters of water containing four grams (0.10 mole) of sodium hydroxide was allowed to stand at room temperature for two and one-half hours, whereupon a small quantity of plate-like crystals formed. These were dissolved by heating the mixture to seventy degrees centigrade for one-half hour. The reaction mixture was then made acid with fifty milliliters of three normal hydrochloric acid and refrigerated to give a precipitate of 3.05 grams of needle-like crystals melting at 173–177 degrees centigrade. On crystallization from a dioxane-water mixture, the compound melted at 211–215 degrees centigrade. The melting point was found to vary somewhat with the rate of heating.

*Preparation 14.—Dimethyl maleate of 3-beta-hydroxy-5,7,9(11)-pregnatrien-20-one*

A suspension of 0.400 gram of the maleic acid adduct of 3-beta-hydroxy-5,7,9(11)-pregnatrien-20-one, in fifty milliliters of dry ether, was cooled in an ice-salt bath while a slight excess of diazomethane in methylene chloride was added over a 25-minute period with stirring. Ten minutes after addition was complete, the solution was placed on a steam bath and concentrated rapidly to dryness. The residue was crystallized from an acetone-water mixture to give 0.34 gram of the dimethyl maleate of 3-beta-hydroxy-5,7,9(11)-pregnatrien-20-one, melting at 193–195 degrees centigrade. After chromatography and recrystallization, the compound melted at 192–197 degrees centigrade.

In the same manner as given above, other dialkyl maleates, e. g., the diethyl, dipropyl, diisopropyl, dibutyl, and dioctyl maleates of 3-hydroxy-5,7,9(11)-pregnatrien-20-one are prepared from 3-hydroxy-5,7,9(11)-pregnatrien-20-one maleic acid adduct and the appropriate diazoalkane, or by other equivalent esterification procedure.

*Preparation 15.—Dimethyl maleate of 3-beta-acetoxy-5,7,9(11)-pregnatrien-20-one*

A solution of 0.15 gram of the dimethyl maleate adduct of 3-beta-hydroxy-5,7,9(11)-pregnatrien-20-one, in 2.5 milliliters of acetic anhydride and 2.5 milliliters of pyridine, was heated on the steam bath for ninety minutes, cooled to room temperature, and poured into ice-water. The resulting precipitate was collected by filtration and found to melt at 205–209 degrees centigrade. Recrystallization from methanol gave the dimethyl maleate of 3-beta-acetoxy-5,7,9(11)-pregnatrien-20-one, melting at 207–211 degrees centigrade.

Analysis:

Calculated for $C_{29}H_{38}O_7$____C, 69.86; H, 7.68
Found _____ 69.81; 7.86
                                      69.70; 7.62

By the same manner of esterification, the following C-3 esters were prepared: (1) dimethyl maleate adduct of 3-beta-formoxy-5,7,9(11)-pregnatrien-20-one, melting point 223–230 degrees centigrade, and (2) the dimethyl maleate adduct of 3-beta-benzoyloxy-5,7,9(11)-pregnatrien-20-one, melting point 250–254 degrees centigrade.

*Preparation 16.—Maleic anhydride adduct of 3-beta-heptanoyloxy-5,7,9(11)-pregnatrien-20-one*

The maleic anhydride adduct of 3-beta-heptanoyloxy - 5,7,9(11) - pregnatrien-20-one, melting point 170–171 degrees centigrade, was prepared by refluxing the maleic acid adduct of 3-beta - hydroxy - 5,7,9(11) - pregnatrien - 20 - one with heptylic anhydride and pyridine for a period of twenty hours, and working up the reaction product in the usual manner.

*Preparation 17.—Maleic anhydride adduct of 3-beta-hydroxy-5,7,9(11)-pregnatrien-20-one*

Similarly, to the procedure described in Preparation 16 the maleic anhydride adduct of 3-beta-hydroxy-5,7,9(11)-pregnatrien - 20 - one, melting point about 195 degrees centigrade, was prepared by refluxing the maleic acid adduct of 3-beta-hydroxy - 5,7,9(11) - pregnatrien - 20 - one with Dowtherm for eight hours. The 3-hydroxy-maleic anhydride adduct is also obtained by heating the 3-hydroxy maleic acid adduct to just above its melting point, which procedure causes water to be evolved, with the closing of the anhydride ring.

In the same manner as given above, still other 5,7,9(11)-pregnatrien-20-one adducts are prepared from the corresponding 3,22-diacyloxybisnor-5,7,9(11),20(22)-cholatetraene maleic acid, maleic acid anhydride, and maleic acid diester adducts. Such compounds include the 3-formoxy - 5,7,9(11) - pregnatrien - 20 - one maleic acid, maleic acid anhydride, dimethyl maleate, diethyl maleate, dibutyl maleate, dioctyl maleate, diisopropyl maleate, dibenzyl maleate, and like adducts; the corresponding 3-propionoxy, butyroxy, valeroxy, hexanoyloxy, heptanoyloxy, octanoyloxy, benzoyloxy, and similar 20-ketone adducts, including, for example, 3-propionoxy-5,7,9-(11)-pregnatrien-20-one dipropyl maleate, 3-benzoyloxy-5,7,9(11)-pregnatrien-20-one dibenzyl maleate, 3-heptanoyloxy-5,7,9(11)-pregnatrien-20-one dimethyl maleate, 3-valeroyloxy-5,7,9(11)-pregnatrien-20-one maleic acid anhydride adducts, and the like.

*Example 1.—3-beta-acetoxy-12-bromo-5,7,9(11)-pregnatrien-20-one maleic anhydride adduct*

3-beta-acetoxy-5,7,9(11)-pregnatrien-20-one maleic anhydride adduct (0.9 gram) was mixed with 0.36 gram of N-bromosuccinimide and sixty milliliters of carbon tetrachloride. The mixture was heated at reflux and irradiated with a 200-watt bulb for fifteen minutes, cooled, and the succinimide removed by filtration. The filtrate was concentrated to dryness in vacuo and the residue crystallized from acetone-water to yield 0.82 gram of 3-beta-acetoxy-12-bromo-5,7,9(11)-pregnatrien-20-one maleic anhydride adduct, M. P. 213–215 degrees centigrade. Recrystallization from acetone raised the melting point to 216–218 degrees centigrade.

*Example 2.—3-beta-acetoxy-12-bromo-5,7,9(11)-pregnatrien-20-one maleic anhydride adduct*

3-beta-acetoxy-5,7,9(11)-pregnatrien-20-one maleic anhydride adduct (20.3 grams) was dissolved in one liter of chloroform and two liters of sulfuric acid washed petroleum ether. Oxygen was bubbled through the solution for ten minutes, whereafter four milliliters of ascaridol was added. To this solution was added a solution of 20.3 grams of N-bromo-succinimide in 1200 milliliters of chloroform through which oxygen had been bubbled for ten minutes. Immediately after the two solutions were mixed, 380 milliliters of 0.8 normal sulfuric acid was added and stirring begun. After stirring for fifty hours, a solution of sodium bisulfite was added until all color was removed. This was followed by 100 milliliters of water. The solution was concentrated on the steam bath until all of the chloroform was removed, and the resulting crude solid recrystallized from acetone-isopropyl ether. Three crops of crystals were obtained, for a total of 20.3 grams of 3-beta-acetoxy-12-bromo-5,7,9(11)-pregnatrien-20-one maleic anhydride adduct. A sample recrystallized for analysis melted at 221–222 degrees centigrade with decomposition.

Analysis:
Calculated for
$C_{27}H_{31}O_6Br$ _____ C, 61.02; H, 5.88; Br, 15.04
Found _____ 61.12   5.80   15.48
                       61.35   6.11   15.21

$[alpha]_D^{24.5}+265.0$ degrees (chloroform).

*Example 3.—3-beta-acetoxy-12-bromo-5,7,9(11)-pregnatrien-20-one maleic anhydride adduct*

A solution of 3.0 grams of 3-beta-acetoxy-5,7,9-(11)-pregnatrien-20-one maleic anhydride adduct in a mixture of 250 milliliters of methylene chloride and 300 milliliters of petroleum ether was stirred at room temperature while 0.5 milliliter of ascaridol, 25 milliliters of 0.8 normal sulfuric acid, and one milliliter of bromine were added in that order. After eighteen hours, one gram of sodium bisulfite was added to remove excess bromine. The methylene chloride-petroleum ether layer was separated and washed with water, concentrated to dryness in vacuo, and the crude product washed with water and ether, leaving a residue of 3.05 grams. This was recrystalized from acetone-isopropyl ether to give 2.84 grams of crystalline 3-beta-acetoxy-12-bromo-5,7,9(11)-pregnatrien-20-one maleic anhydride adduct.

*Example 4.—3-beta-acetoxy-12-bromo-5,7,9(11)-pregnatrien-20-one dimethyl maleate adduct*

Similarly, using the method of either Example 1 or Example 2 above, 3-beta-acetoxy-5,7,9(11)-pregnatrien-20-one dimethyl maleate adduct is converted to 3-beta-acetoxy-12-bromo-5,7,9(11)-pregnatrien-20-one dimethyl maleate adduct, M. P. 207.5–211 degrees centigrade.

Analysis:
Calculated for
$C_{29}H_{37}O_7Br$ _____ C, 60.31; H, 6.46; Br, 13.84
Found _____ 59.69   6.46   13.05
                       60.98   6.45   13.09

$[alpha]_D^{25}+266.1$ degrees (chloroform).

*Example 5.—3-beta-benzoyloxy-12-bromo-5,7,9(11)-pregnatrien-20-one dimethyl maleate*

In exactly the same manner as given in the above examples, 3-beta-benzoyloxy-12-bromo-5,7,9(11)-pregnatrien-20-one dimethyl maleate is prepared by bromination of 3-beta-benzoyloxy-5,7,9(11)-pregnatrien-20-one dimethyl maleate prepared as in Preparation 15.

In the same manner as given in the preceding examples, other 3-acyloxy-12-bromo-5,7,9(11)-pregnatrien-20-one maleic acid, maleic anhydride, and dialkyl maleate adducts are prepared from the corresponding 3-acyloxy-5,7,9(11)-pregnatrien-20-one adduct. Such compounds include, for example, 3-formoxy, 3-propionoxy, 3-butyroxy, 3-isobutyroxy, 3-valeroyloxy, 3-hexanoyloxy, 3-heptanoyloxy, 3-benzoyloxy, and 3-octanoyloxy-12-bromo-5,7,9(11)-pregnatrien-20-one maleic acid, maleic anhydride, dimethyl maleate, diethyl maleate, dipropyl maleate, diisopropyl maleate, dibutyl maleate, diamyl maleate, dihexyl maleate, diheptyl maleate, dibenzyl maleate, dioctyl maleate, and like 3-acyloxy-12-bromo-5,7,9(11)-pregnatrien-20-one maleic acid, maleic anhydride, and maleic acid diester adducts.

As stated in the foregoing, the compounds of the present invention are extremely useful in the preparation of other steroid compounds of interest and importance per se as therapeutics, as well as in the preparation of still other steroids having an acyloxy or hydroxy group at carbon atom twelve.

The 12-hydroxy adducts have the formula:

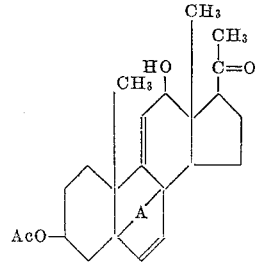

wherein A and Ac have the values previously assigned. These 3-acyloxy-12-hydroxy-5,7,9(11)-pregnatrien-20-one adducts are prepared from the corresponding 12-bromo adducts using silver nitrate. The 12-bromo steroid adduct is dissolved in an organic solvent, e. g., acetone, dioxane, or the like, and the silver nitrate in aqueous solution is added thereto with stirring. Temperatures of from about zero to about fifty degrees centigrade are suitable, with room temperatures being preferred. At the end of the reaction period, usually about an hour, the silver bromide is removed by filtration and the 3-acyloxy-12-hydroxy-5,7,-

9(11)-pregnatrien-20-one adduct precipitated by addition of water. The compounds may be recrystallized from an organic solvent to yield a more highly purified product, if desired.

*Example A. — 3-beta-acetoxy-12-hydroxy-5,7,9-(11)-pregnatrien-20-one maleic anhydride adduct*

To a solution of 1.5 grams of 3-beta-acetoxy-12-bromo-5,7,9(11)-pregnatrien-20-one maleic anhydride adduct in 150 milliliters of acetone was added sixty milliliters of 0.1 normal silver nitrate solution. The addition was made portionwise with shaking. After one hour at room temperature, the silver bromide which formed was removed by filtration and the filtrate diluted with water until crystallization began. The product, filtered after cooling, was 1.2 grams of 3-beta-acetoxy-12-hydroxy-5,7,9(11)-pregnatrien-20-one maleic anhydride adduct, M. P. 225-234 degrees centigrade. A sample recrystallized for analysis melted at 234-237 degrees centigrade.
Analysis:

Calculated for $C_{27}H_{32}O_7$ ____ C, 69.21; H, 6.89
Found _____ 69.92  6.99
                            69.84  7.02

$[alpha]_D^{25} + 126.6$ degrees (chloroform).

*Example B.*—Similarly, by the method of the preceding example, the corresponding 12-bromo dimethyl maleate adduct was converted to 3-beta-acetoxy-12-hydroxy-5,7,9(11)-pregnatrien-20-one dimethyl maleate adduct, M. P. 205-214 degrees centigrade. $[alpha]_D^{25} + 139.6$ degrees (chloroform).

Analysis:

Calculated for $C_{29}H_{38}O_3$ ____ C, 67.68; H, 7.44
Found _____ 67.70  7.48
                            67.49  7.54

The 12-hydroxy adducts are also prepared from the corresponding 12-acyloxy compounds, using a base in sufficient quantity to convert the 12-acyloxy group to a hydroxy group. This is productive of the diacid adduct, which may then be converted to the anhydride with heat in a vacuum, or to the dialkyl maleates by treatment with a diazoalkane.

The 12-acyloxy compounds have the formula:

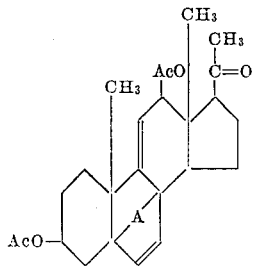

wherein A and Ac have the values previously assigned. These 12-acyloxy compounds are prepared from the corresponding 12-bromo compounds using either zinc and the selected acid, e. g., acetic acid, or an alkali metal salt of a selected acid and the same acid. In either case, the reactants are admixed and heated to a suitable reaction temperature. In the case of zinc-acid, the temperature is usually about fifty to one hundred degrees centigrade, while in the case of the acid salt-acid, the temperature is usually from about one hundred to 150 degrees centigrade, e. g., the reflux temperature of the acid employed. Removal of zinc or excess acid and acid salt, as the case may be, and extraction or addition of water, is productive of an extract or precipitate of the 12-acyloxy adduct, which is recovered in conventional procedure.

Alternatively, the 3,12-diacyloxy-5,7,9(11)-pregnatrien-20-one adducts are prepared from the corresponding 12-hydroxy adduct using an acid anhydride, e. g., acetic anhydride, and pyridine or other base, at about room temperature to 100 degrees centigrade and working up the reaction product in conventional manner, e. g., by drowning out the crystalline product by addition of water and recrystallizing the product.

*Example C.—3-beta,12-diacetoxy-5,7,9(11)-pregnatrien-20-one maleic anhydride adduct*

3-beta-acetoxy-12-bromo-5,7,9(11)-pregnatrien-20-one maleic anhydride adduct (0.5 gram), 0.5 gram sodium acetate (dried for one hour at 100 degrees centigrade), and 25 milliliters of acetic acid were mixed and heated at reflux for one hour. The acetic acid was removed in vacuo and the residue taken up in methylene chloride and water. The methylene chloride layer was separated, washed with water and dried. Twenty-five milliliters of isopropyl ether was added and the solution concentrated until all of the methylene chloride was removed. Upon cooling, 0.27 gram of 3-beta,12-diacetoxy-5,7,9(11)-pregnatrien-20-one maleic anhydride adduct, M. P. 232-245 degrees centigrade, crystallized and was filtered from the solution. Several recrystallizations from acetone-water raised the melting point to 248-250 degrees centigrade. $[alpha]_D^{25} + 256$ degrees (chloroform).

Analysis:
Calculated for $C_{29}H_{34}O_8$ ___C, 68.21; H, 6.71
Found _____ 67.31;  6.73
                            67.38;  6.50
                            67.65;  6.55

*Example D.—3-beta,12-diacetoxy-5,7,9(11)-pregnatrien-20-one dimethyl maleate adduct*

3-beta-acetoxy-12-bromo-5,7,9(11)-pregnatrien-20-one dimethyl maleate adduct (2.7 grams) was dissolved in 100 milliliters of acetic acid with warming on the steam bath. Ten grams of zinc dust was then added portionwise to the warm solution over a period of ten minutes and the mixture heated for one additional hour. The zinc dust was removed by filtration while the mixture was still hot and the filtrate diluted with one liter of water. The product, 3-beta,12-diacetoxy-5,7,9(11)-pregnatrien-20-one dimethyl maleate adduct, precipitated and was collected by filtration. The yield was 1.98 grams, M. P. 202-210 degrees centigrade, which on recrystallization from alcohol-water melted at 216-218 degrees centigrade.

$[alpha]_D^{25.5} + 270.42$ (chloroform)

Analysis:
Calculated for
$C_{31}H_{42}O_9$ _____ C, 66.64; H, 7.58; $CH_3CO$, 15.41
Found _____ 66.38  6.98  15.74
                66.95  7.31  15.16
                66.57  7.25

The same compound was obtained by treating 3-beta,12-diacetoxy-5,7,9(11)-pregnatrien-20-one maleic anhydride adduct with diazomethane.

The 3-acyloxy-12-hydroxy or 3,12-diacyloxy adducts may be used to prepare 3,12-dihydroxy adducts of the formula:

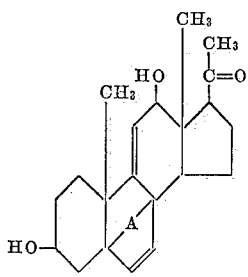

wherein A has the value previously assigned. These dihydroxy compounds are prepared by treatment of the 3,12-diacyloxy adducts with about four moles of base, or of the 3-hydroxy-12-acyloxy adducts with about three moles of base, in an organic solvent such as dioxane, the product being precipitated by concentration of the water-solvent solution after acidification with dilute hydrochloric acid, or in other conventional manner. By this procedure the diacid adduct is produced, which can then be converted to the anhydride adduct by heating under reduced pressure.

The 3-acyloxy-12-hydroxy compounds are readily converted to 3-acyloxy-12-keto-5,7,9(11)-pregnatrien-20-one adducts of the formula:

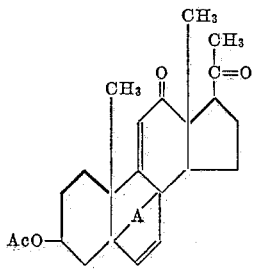

wherein A and Ac have the values previously given. These 3-acyloxy-12-keto adducts are prepared from the 3-acyloxy-12-hydroxy adducts by oxidation with chromic acid. The 12-hydroxy adduct is ordinarily dissolved in acetic acid and an aqueous solution of chromic acid added thereto in a portionwise manner. Decomposition of the excess chromic acid with alcohol, dilution with water, extraction of the mixture with a solvent, e. g., methylene chloride, and removal of solvent leaves a residue of the crude product, which can be chromatographed and recrystallized to give the pure 12-ketone adduct.

The 3-acyloxy-12-keto-5,7,9(11)-pregnatrien-20-one adducts are also prepared directly from the 3-acyloxy-12-bromo-5,7,9(11)-pregnatrien-20-one adducts by reaction with silver chromate. The 12-bromo adduct is dissolved in a suitable solvent, e. g., acetone, and the silver chromate added thereto, followed by a water solution of chromic acid. Upon completion of the reaction, a small quantity of mineral acid, e. g., sulfuric acid, is added thereto and the precipitate filtered from the solution. The filtrate is diluted with water, cooled, and the crystalline 12-keto adduct separated by filtration and purified by chromatography and/or recrystallization, if desired.

*Example E.—3-beta-acetoxy-12-keto-5,7,9(11)-pregnatrien-20-one maleic anhydride adduct*

To a solution of 7.7 grams of 3-beta-acetoxy-12-hydroxy-5,7,9(11)-pregnatrien-20-one maleic anhydride adduct in 300 milliliters of acetic acid was added, dropwise and with stirring, a solution of 1.1 grams of chromic acid in eighteen milliliters of water. The mixture was allowed to stand at room temperature for two hours, excess chromic acid then decomposed by the addition of a small amount of alcohol, and the mixture diluted with 1100 milliliters of water. Extraction with methylene chloride yielded 7.4 grams of crude product on removal of the solvent. This was chromatographed over Superfiltrol-Celite (1:1) and separated into two fractions. One fraction, 1.32 grams, was eluted with ether, while the second fraction was eluted with methanol and weighed 5.83 grams. The ether fraction is believed to be a maleic anhydride adduct corresponding to the dimethyl maleate adduct melting at 218–222 degrees centigrade, for which a proposed formula is given in Example F. Crystallization of the methanol fraction from alcohol-acetone gave 3.15 grams of 3-beta-acetoxy-12-keto-5,7,9(11)-pregnatrien-20-one maleic anhydride adduct, M. P. 222–226 degrees centigrade. Several recrystallizations from methanol raised the melting point to 232–235 degrees centigrade.

Analysis:
Calculated for $C_{27}H_{30}O_7$ -- C, 69.51; H, 6.48
Found ------------------ 69.16.. 6.75
                        68.87   6.92

U. V. peak at 246 mu, extinction coefficient of 9900.

*Example F.—3-beta-acetoxy-12-keto-5,7,9(11)-pregnatrien-20-one dimethyl maleate adduct*

In a similar manner, according to the method of the preceding example, 3-beta-acetoxy-12-hydroxy-5,7,9(11) - pregnatrien - 20 - one dimethyl maleate adduct was converted to 3-beta-acetoxy-12-keto-5,7,9(11)-pregnatrien-20-one dimethyl maleate adduct, M. P. 213–215 degrees centigrade. [Alpha]$_D^{26}$ of +180.2 degrees (chloroform).

Analysis:
Calculated for $C_{29}H_{36}O_8$-- C, 67.95; H, 7.08
Found ------------------ 67.99   7.05
                        67.73   6.90

U. V. peak at 248 mu, extinction coefficient of 12400. Purification of this compound was accomplished by chromatography over an alumina column. Infrared studies supported the proposed structure of the diketone adduct. The diketone was eluted from the column using a 1:1 mixture of benzene and ether. A second fraction was eluted from the column using ether, and was recrystallized and found to melt at 218–222 degrees centigrade.

Analysis:
Calculated for $C_{29}H_{38}O_9$-- C, 65.64; H, 7.22
Found ------------------ .65.64 , 7.16
                        65.86  , 7.34

This compound has the probable structural formula:

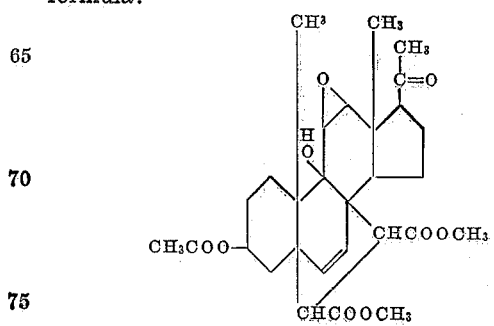

Example G.—3-beta-acetoxy-5,7,9(11)-pregnatrien-12,20-dione maleic anhydride adduct 3-beta-acetoxy-12-bromo-5,7,9(11)-pregnatrien-20-one maleic anhydride adduct (1.0 gram) was dissolved in thirty milliliters of acetone by warming on the steam bath. The solution was cooled to room temperature and 0.46 gram of silver chromate, followed by 0.35 gram of chromic acid dissolved in six milliliters of water, was added thereto. The mixture was stirred for two hours, one milliliter of five normal sulfuric acid added, the mixture stirred for an additional thirty minutes and then filtered. To the filtrate was added 100 milliliters of water. Upon cooling, 0.753 gram of crystalline material, melting at 228–231 degrees centigrade, was obtained. Purification of this material by chromatography over Superfiltrol-Celite gave the pure 3-beta-acetoxy-5,7,9(11)-pregnatrien-12,20-dione maleic anhydride adduct.

Example H.—3-beta-acetoxy-5,7,9(11)-pregnatrien-12,20-dione dimethyl maleate adduct Similarly, by the method of the preceding example, 3-beta-acetoxy-12-bromo-5,7,9(11)-pregnatrien-20-one dimethyl maleate adduct was converted to 3-beta-acetoxy-5,7,9(11)-pregnatrien-12,20-dione dimethyl maleate adduct.

The 3-acyloxy-5,7,9(11)-pregnatrien-12,20-dione maleic acid and maleic anhydride adducts are convertible to 3-acyloxy-5,7,9(11)-pregnatrien-12,20-diones, of the formula:

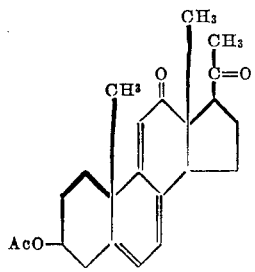

wherein Ac has the value previously given. These compounds are prepared from the corresponding maleic acid or maleic anhydride adducts by a pyrolysis reaction to accomplish removal of the adduct radical. The process consists essentially in heating the 3-acyloxy-5,7,9(11)-pregnatrien-12,20-dione adduct in the presence of an organic amine at a temperature of about 100 to 225 degrees centigrade, with or without the presence of an organic solvent, and thereafter isolating the product. This method has the advantage of being conveniently applicable to large scale work in that it is not necessary to remove the components from the reaction mixture to complete the reaction. It also has the further advantage that the desired triene can be obtained in a high degree of purity and in excellent yields.

Amines which can be used in the process include: secondary aliphatic amines such as dimethylamine, diethylamine, dipropylamine, dibutylamine, diamylamine, dioctylamine; tertiary aliphatic amines such as trimethylamine, triethylamine, triamylamine, methyldioctylamine, methyldiethylamine; secondary and tertiary cycloaliphatic amines such as N-methylcyclohexylamine, N,N-dimethylcyclohexylamine, N,N-diethylcyclohexylamine; secondary and tertiary heterocyclic amines such as pyrrolidine, N-methylmorpholine, N-ethylpyrrolidine, morpholine, piperidine, N-methylpiperidine, 2-methylpiperidine, 1,2-dimethylpiperidine, 1,2,4-trimethylpiperidine, 2,4,6-trimethylpiperidine, 1-ethyl-2,4,6-trimethylpiperidine; aromatic heterocyclic amines such as pyridine, picoline, lutidine, collidine, quinoline, quinaldine, lepidine, 3-methylquinoline; secondary and tertiary carbocyclic aromatic amines such as N-methylaniline, N-ethylaniline, N-butylaniline, N-benzylaniline, N,N-dimethylaniline, N,N-diethylaniline, N,N-dibutylaniline, N,N-dibenzylaniline, N-methyltoluidine, N,N-diethyltoluidine, N-ethylxylidine, N,N-dimethylxylidine; substituted aliphatic amines such as diethylaminoethanol, dibutylaminoethanol, N-pyrrolidylethanol, N-piperidylethanol; substituted aromatic amines such as ortho-methoxy-N,N-dimethylaniline, para-ethoxy-N,N-diethylaniline, para-chloro-N,N-dimethylaniline, para-bromo-N,N-diethylaniline, para-fluoro-N,N-dibutylaniline, N,N-dimethylmesidine; secondary and tertiary aralkyl amines such as methylbenzylamine, dimethylbenzylamine, propylbenzylamine, diisopropylphenethylamine, diethylphenylisopropylamine; and primary amines such as butylamine, hexylamine, octylamine, cyclohexylamine, aniline, toluidine, xylidine and the like.

The process thus comprises heating a selected 3-acyloxy-12,20-dione adduct to a temperature between about 100 and 225 degrees centigrade, preferably between about 175 and 200 degrees centigrade, in the presence of an organic amine, removing excess amine, and recovering the product, wherein the maleic acid or maleic anhydride adduct has been eliminated from the molecule, with production of the conjugated double bond system at carbon atoms 5,6:7,8. The time required for the reaction is usually from about one to eight hours, depending upon variable factors such as the particular steroid adduct treated, the amine employed, and the temperature of reaction. Ordinarily, a reaction period of about four hours is entirely satisfactory, although, at the lower temperatures, a more extended period may be employed to advantage. The employment of pressure may in some cases be advantageous, although it is in most cases preferred to conduct the pyrolysis reaction at atmospheric pressure. After completion of the reaction, the pure triene product can be recovered in any conventional manner, such as by evaporation of solvent in vacuo, redissolving the residue in an organic solvent, e. g., methanol, diluting with water, extracting with ether, washing the solution until neutral, drying, evaporating to dryness, chromatographing over an alumina column, and recrystallizing from an organic solvent, if desired.

Example I.—3-beta-acetoxy-5,7,9(11)-pregnatrien-12,20-dione 3-beta-acetoxy-5,7,9(11)-pregnatrien-12,20-dione maleic anhydride adduct (3.0 grams) was mixed with thirty milliliters of dimethylbenzylamine and heated at reflux temperature for six hours, the compound going into solution as soon as heat was applied. The solvent was then removed in vacuo and the residue dissolved in fifty milliliters of methanol, diluted with 300 milliliters of water, and extracted with four 75-milliliter portions of ether. The ether solution was washed with 200 milliliters of cold two percent hydrochloric acid solution, 200 milliliters of cold one percent sodium carbonate solution, and water. After drying the solution and evaporating to dryness, 2.01 grams of residue was obtained. This residue was purified by chromatography over alumina, resulting in 0.62 gram of crystalline 3-beta-acetoxy-5,7,9(11)-pregnatrien-12,20-dione, M. P. 150–158 degrees centigrade. Recrystallization from alcohol raised the melting point to 160–162 degrees centigrade.

Analysis:
  Calculated for $C_{23}H_{28}O_4$ ___ C, 74.97; H, 7.66
  Found _____ 75.13  7.31
                             74.79  7.60

The 3 - acyloxy - 5,7,9(11)-pregnatrien-12,20-diones are convertible to 3-hydroxy-5,7,9(11)-pregnatrien-12,20-dione, of the formula:

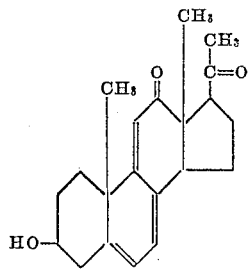

which are prepared by saponification of the 3-acyloxy compound in an alcohol, e. g., methanol, or dioxane, as well as like solvents, using at least one equivalent of aqueous base. The product is isolated by drowning out with water or in other conventional manner, and may be purified by recrystallization from an organic solvent, if desired.

The 3 - hydroxy - 5,7,9(11)-pregnatrien-12,20-dione is in turn convertible to the compound 5,7,9(11) - pregnatrien - 3,12,20 - trione, of the formula:

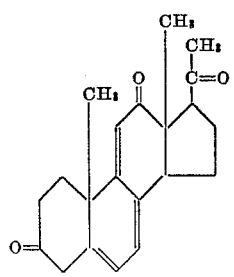

This compound is produced by dissolving the starting 3-hydroxy compound in a suitable organic solvent, e. g., toluene, adding cyclohexanone and aluminum isopropoxide, and refluxing for from three to eight hours. The reaction product may then be poured into a dilute aqueous solution of ammonium chloride, and the triketone product extracted with ether. The ether solution may then be washed with dilute hydrochloric acid and water, dried, and the solution evaporated to dryness. The residue may be crystallized from an organic solvent to give a more highly purified triketone product, if desired.

The adduct radicals, i. e., the maleic acid or maleic anhydride radicals, can also be removed, in the manner given previously for the preparation of 3-acyloxy-5,7,9(11)-pregnatrien-12,20-diones from the 5:8 maleic acid or maleic anhydride adducts thereof, from various other steroid adducts mentioned previously, resulting in the corresponding steroid containing the 5,7,9(11) triene system. For example, the adduct radical may be removed from a 3-acyloxy-12-hydroxy - 5,7,9(11) - pregnatrien-20-one maleic acid or maleic anhydride adduct to give 3 - acyloxy - 12 - hydroxy-5,7,9(11)-pregnatrien-20-ones, of the formula:

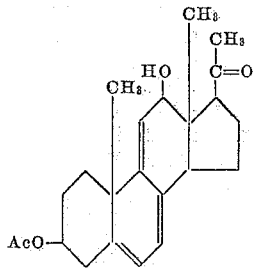

wherein Ac has the value previously given.

Likewise, the adduct radical can be removed, by the same procedure, from 3,12-diacyloxy-5,7,9(11)-pregnatrien-20-one maleic acid or maleic anhydride adducts to give 3,12-diacyloxy-5,7,9(11)-pregnatrien-20-ones of the formula:

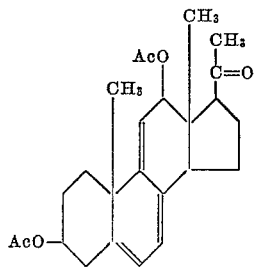

wherein Ac has the value previously assigned.

In the same manner, the maleic acid or maleic anhydride radical can be removed from such adducts of 3,12-dihydroxy-5,7,9(11)-pregnatrien-20-one, to give the corresponding 3,12-dihydroxy-5,7,9(11)-pregnatrien-20-one, of the formula:

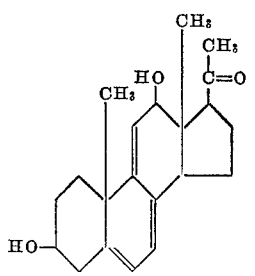

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 12 - bromo - 3 - acyloxy - 5,7,9(11) - pregnatrien-20-one adduct of the formula:

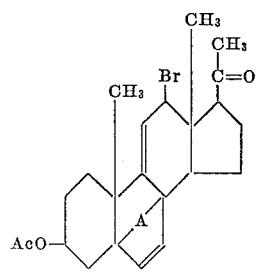

wherein Ac is the residue of an unsubstituted organic monocarboxylic acid containing from one to eight carbon atoms, inclusive, and wherein A is the adduct radical of a dienophile selected from the group consisting of maleic acid, maleic anhydride, and lower-alkyl diesters of maleic acid wherein the esterifying groups contain from one to eight carbon atoms, inclusive.

2. 12-bromo-3-acetoxy-5,7,9(11)-pregnatrien-20-one maleic anhydride adduct.

3. 12-bromo-3-acetoxy-5,7,9(11)-pregnatrien-20-one dimethyl maleate adduct.

4. A compound of claim 1, wherein AcO is the acetoxy group.

ROBERT H. LEVIN.
A VERN McINTOSH, Jr.
GEORGE B. SPERO.

REFERENCES CITED

The following references are of record in the file of this patent:

UNITED STATES PATENTS

| Number | Name | Date |
| --- | --- | --- |
| 2,441,091 | Vliet | May 4, 1948 |

OTHER REFERENCES

Ziegler: Liebigs Annalen, 551, pp. 80–119 (1942).

Djerassi: Chemical Reviews, 43, pp. 271–317 (1948).